United States Patent

Cannan, Jr. et al.

Patent Number: 5,224,621
Date of Patent: Jul. 6, 1993

[54] DOUBLE WALL UNDERGROUND STORAGE TANK

[75] Inventors: Edward B. Cannan, Jr., Conroe, Tex.; Joseph R. Wiegand, Kern, Calif.; David H. Bartlow, Conroe, Tex.

[73] Assignee: Owens-Corning Fiberglas Technology, Inc., Summit, Ill.

[21] Appl. No.: 925,343

[22] Filed: Aug. 4, 1992

[51] Int. Cl.⁵ .............................................. B65D 7/46
[52] U.S. Cl. ................................. 220/414; 220/445; 220/426
[58] Field of Search ............ 220/588, 589, 592, 4.12, 220/4.13, 414, 445, 466, 426

[56] References Cited

U.S. PATENT DOCUMENTS

| | | | |
|---|---|---|---|
| 3,319,430 | 5/1967 | Small | 220/426 |
| 3,595,423 | 7/1971 | Yamanoto | 220/426 |
| 3,937,351 | 2/1976 | Rigg | 220/414 |
| 4,676,093 | 6/1987 | Pugnale et al. | |
| 4,714,094 | 12/1987 | Tovaguaro | 220/414 |
| 4,778,075 | 10/1988 | Wiegand et al. | 220/414 |
| 4,785,956 | 11/1988 | Kepler et al. | 220/414 |
| 4,865,220 | 9/1989 | Wiegand | |
| 4,923,081 | 5/1990 | Weaver | |
| 4,933,040 | 6/1990 | Wesley, Jr. | 220/414 |
| 5,115,936 | 5/1992 | Bartlow | |

Primary Examiner—Joseph Man-Fu Moy
Attorney, Agent, or Firm—Patrick P. Pacella; Ted C. Gillespie

[57] ABSTRACT

An underground storage tank comprises a cylindrical inner wall, a cylindrical outer wall of plastic resin and reinforcement fibers, and a layer of spacer filaments wound around the inner wall, the spacer filaments separating the inner and outer walls, and the spacer filaments being at least partially surrounded by voids to enable liquids to flow along the filaments.

20 Claims, 2 Drawing Sheets

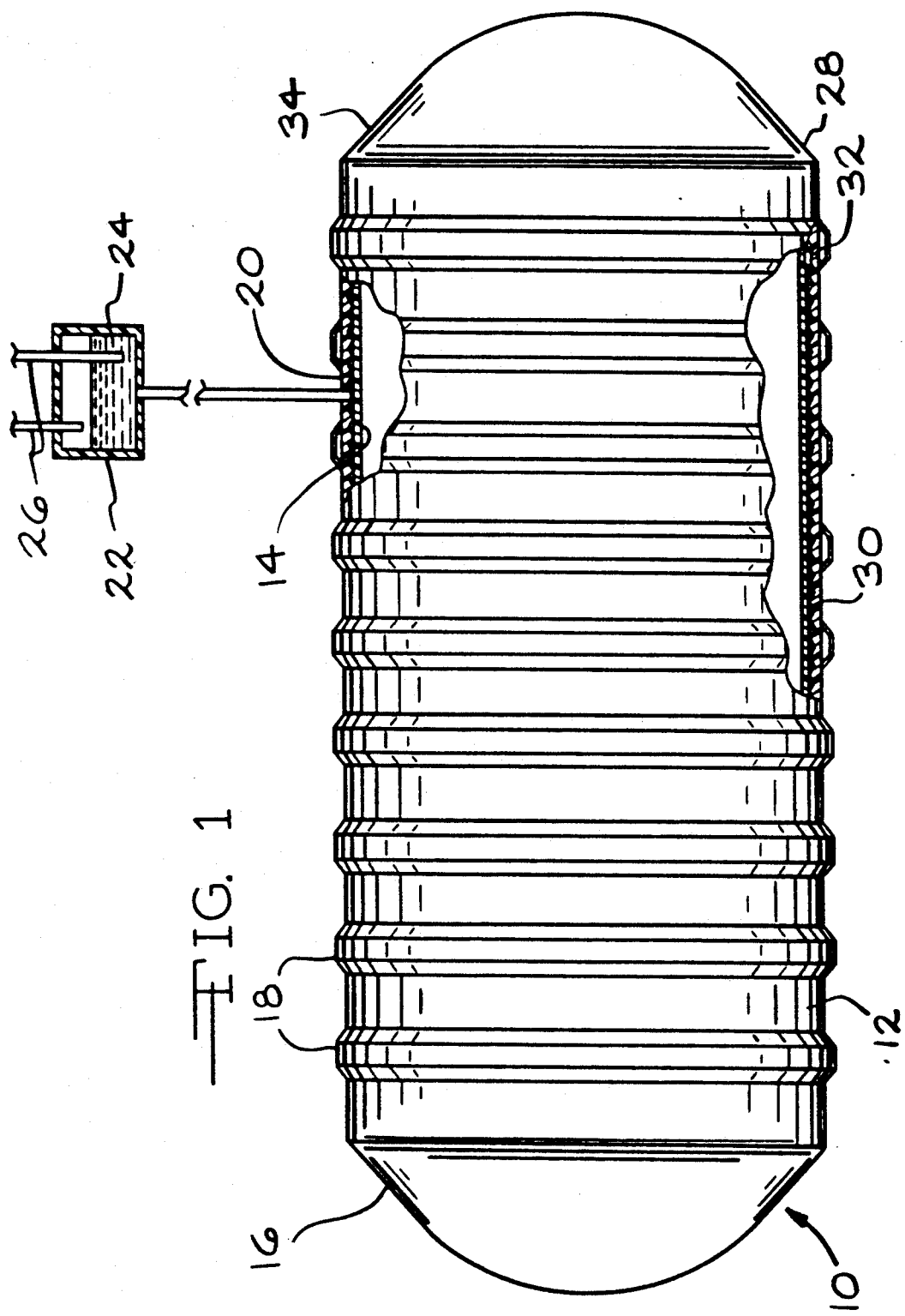

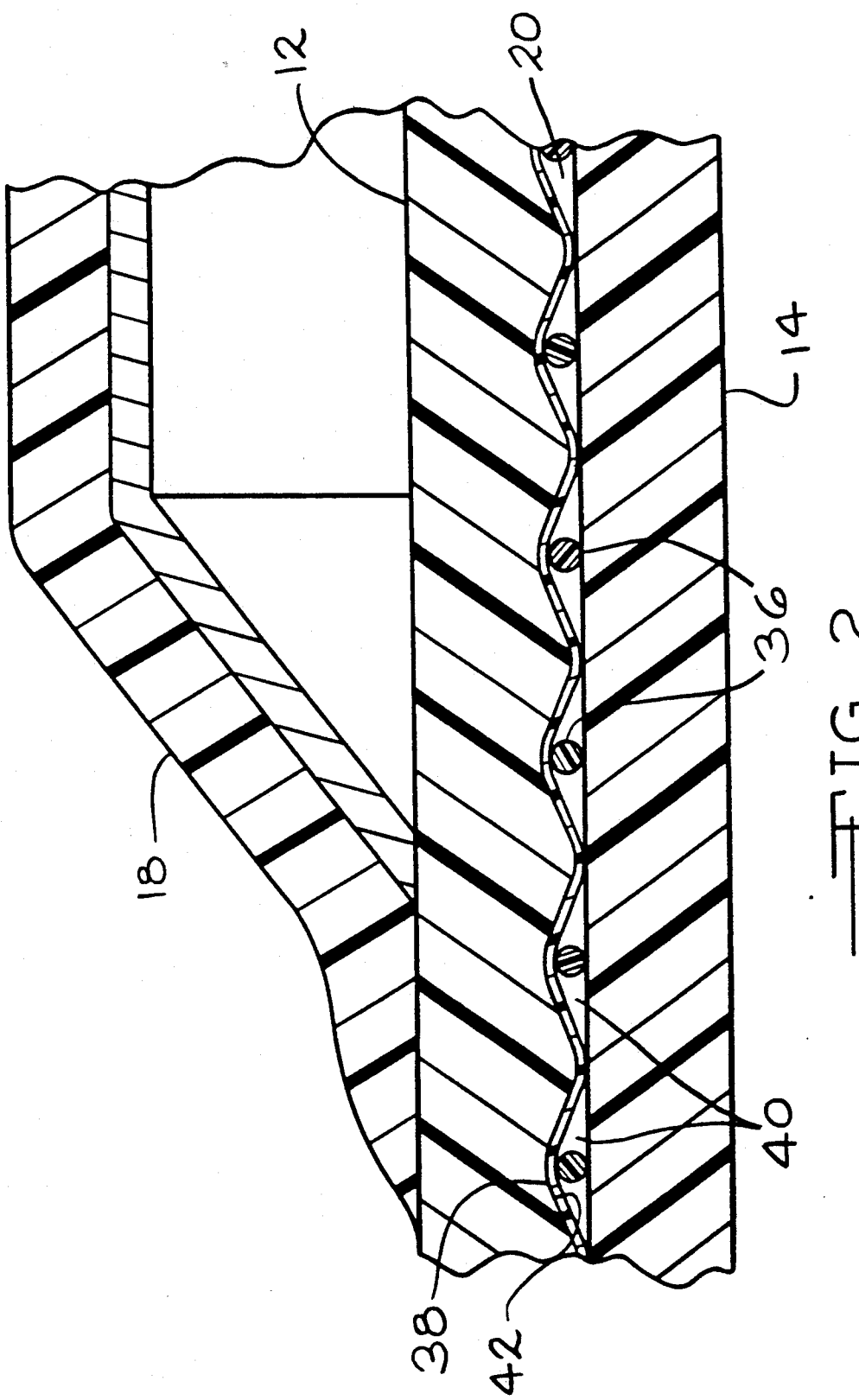

DOUBLE WALL UNDERGROUND STORAGE TANK

TECHNICAL FIELD

This invention relates to underground storage tanks suitable for storing liquids. In one particular aspect, this invention relates to double wall underground storage tanks adapted to contain leak detecting liquids between the inner and outer walls of the tank. In another aspect, this invention relates to double wall underground storage tanks with a dry annular space, and means to detect the presence of liquids with in the annular space.

BACKGROUND ART

Underground storage tanks, which are typically made of fiberglass reinforced plastic, are well known in the art. Such tanks are commonly used to store gasolines and other fuels, as well as corrosive liquids. Typically, these tanks have a plurality of spaced-apart ribs around the circumference of the generally cylindrical tank. Recent innovations in such underground tanks include the development of a double wall tank. Double wall tanks provide a double barrier to prevent leakage of the liquids from the tank. Also, the annular space between the inner and outer walls can be filled with a leak detecting fluid which can be monitored to detect leaks in the tank's inner or outer wall. The annular space between the inner and outer tank walls can be connected to the hollow ribs in order to form a leak detecting space between the inner and outer walls.

It is known to use a plastic mesh material as a spacer to separate the outer tank wall from the inner tank wall, and to help define the annular space. Such mesh is typically polyethylene mesh. In tanks having a dry annular space, i.e., not filled with a leak detecting fluid, the bottom of the tank is usually adapted with a fluid detecting means. In such a tank, a leak in either the inner or outer tank walls introduces a fluid into the annular space, and this fluid flows downwardly within the annular space, eventually reaching the fluid detecting means at the bottom of the tank.

In tanks designed for the presence of a leak-detecting liquid permanently within the annular space, a leak in the inner or outer tank walls causes the level of the leak detecting fluid in the reservoir to either rise or fall, thereby activating an alarm signal.

An important consideration in manufacturing double wall underground storage tanks is the cost of manufacture. Also, it is imperative to have good fluid communication throughout the annular space so that a leak in any one part of the tank is communicated to the leak-detecting sensors. Therefore, it is important for good fluid flow paths to be established within the annular space, particularly in the vertical direction.

The plastic mesh material typically used as a separator is a woven or non-woven criss-cross mesh. This mesh, although performing quite well as a separator, requires a significant amount of labor to apply. It would be desirable for the annular space to be provided with a separator material which is a low-cost material, easy to apply, and enabling the relatively rapid flow of fluids within the annular space.

DISCLOSURE OF THE INVENTION

There is now provided a new underground storage tank in which the separator material between the inner and outer tank walls is a winding of a spacer filament. The spacer filament is wound in such a way as to provide voids which extend circumferentially around the tank, thereby enabling liquids to flow along the filaments, preferably in a generally vertical direction so that leak detecting sensors can be activated.

According to this invention, there is provided a double wall underground storage tank comprising a cylindrical inner wall, a cylindrical outer wall comprising plastic resin and reinforcement fibers, and a layer of spacer filaments wound around the inner wall, the spacer filaments separating the inner and outer walls, and the spacer filaments being at least partially surrounded by voids to enable liquids to flow along the filaments. The inner wall can be steel or can comprise plastic resin and reinforcement fibers.

The double wall underground storage tank of this invention is advantageous over other tanks in that the spacer filaments can be easily and efficiently applied by existing tank manufacturing equipment. Also, the void spaces defined or created by the spacer filaments significantly increase the speed of vertical flow of leak-detecting fluid within the annular space.

In a specific embodiment of the invention, the spacer filament are generally parallel to each other. Preferably, the spacer filaments are spirally wound around the cylindrical inner wall. In one embodiment of the invention, the spacer filaments are spiral wound in two directions, resulting in a helical application. Preferably, the spacer filaments are monofilaments, and most preferably comprised of polypropylene.

In a preferred embodiment of the invention, the void spaces extend substantially without interruption from the top of the tank to the bottom of the tank.

In a specific embodiment of the invention, a flow channel is positioned along the bottom of the tank to enable fluids to flow along the length of the tank.

BRIEF DESCRIPTION OF THE DRAWINGS

FIG. 1 is a schematic view in elevation of an underground storage tank of the invention, with portions cut away to show the flow channel and reservoir for leak detecting liquid.

FIG. 2 is a schematic view in elevation of part of the tank of FIG. 1 showing a portion of the inner and outer tank walls and a rib.

BEST MODE OF CARRYING OUT THE INVENTION

As shown if FIG. 1, tank 10 is comprised of cylindrical tank outer wall 12 and cylindrical tank inner wall 14, on which are placed end caps 16 and ribs 18. The two walls define a space therebetween, annular space 20. It is to be understood that the terms "cylindrical inner wall" and "cylindrical outer wall" encompass cylindrical walls having ribs or other types of reinforcing.

In a wet system, the annular space is filled with a leak detecting fluid, as is known in the art. Reservoir 22 can be positioned on the tank and in communication with the annular space to contain leak-detecting liquid 24. Sensors 26 can be positioned within the reservoir to provide a signal whenever the level of the leak-detecting liquid increases or decreases beyond a predetermined amount. At the bottom of the tank 28 a means for enabling liquids to travel horizontally, such as flow channel 30, can be positioned to enable liquids to flow horizontally from one end of the tank to the other. Positioned at the lowest end of the tank is a means for detecting the presence of liquid, such as liquid sensor 32. In the dry tank, any liquid reaching the annular space at the top of the tank 34 will flow down through the annular space, reach the flow channel and flow along the flow channel to the sensor 32 which will detect the presence of a liquid.

It is to be understood that the tank can be designed either for a wet or dry annular space. When the tank is designed for a wet annular space, the inner tank needs reinforcement, not shown, in order to stand the pressure of the leak-detecting liquid. In this liquid system, the annular space would preferably be connected to a reservoir, as shown in FIG. 1, for sensing changes in the liquid as would result from a leak in either the inner or outer tank walls.

In the alternative, if the tank were designed as a dry tank system, then the bottom of the tank would be adapted with the flow channel and the liquid sensor so that liquids entering the annular space would immediately flow downwardly and be sensed by the sensor to indicate the presence of a liquid.

As shown in FIG. 2, positioned on top of the tank inner wall are spacer filaments 36. Preferably the spacer filaments are positioned with a spacing of about one per half-inch. It has been found useful to use monofilaments for the spacer filaments, preferably made of a foam-oriented polypropylene material (FOPP), available from Engineered Monofilaments, Williston, Vt. A typical diameter for the spacer filaments is about 0.025 inches. The spacer filaments can be applied in a spirally wound fashion or can be placed circumferentially. Alternatively, the spacer filaments can be applied in a double spiral path, i.e. helically.

During construction of the double wall tank, separator layer 38 is positioned over the spacer filaments before construction of the outer tank wall. The separator layer can be any material sufficient to prevent bonding of the outer tank wall to the inner tank wall, thereby preserving the annular space for the communication of liquids. A separator layer sufficient for use with the invention is Mylar.

As shown, the separator layer is forced down into contact with the inner tank wall during the construction of the outer tank wall, but there are still small open areas, such as void spaces 40, immediately adjacent to the spacer filaments. It is these void spaces which provide an easy passageway for the flow of liquids in the annular space, thereby enabling rapid detection of leaks. Since the outer tank wall is comprised of plastic resin and reinforcement fibers which are molded over the separator layer, the inside edge 42 of the outer wall develops a curved or corrugated shape which is permanently molded into the surface of the tank outer wall. Because this corrugated surface is permanently a part of the tank outer wall, flow is guaranteed independent of physical state of the spacer filaments. The cross-sectional area of each void space is preferably within the range of from about 0.0020 square inches to about 0.0001 square inches. Most preferably, the cross-sectional area of each void space is about 0.0005 square inches.

It has been found that the permanent molding of the void spaces into the inside edge of the outer tank wall provides a flow path for rapid flow of liquids within the annular space. Preferably, these void spaces extend substantially without interruption from the top of the tank to the bottom of the tank. Preferably, the rate of water flow within the annular space from the top of the tank to the bottom of the tank is less than two minutes.

The flow channel can be any means for enabling the flow of liquid from one end of the tank to the other along the bottom of the tank. One method suitable for making the flow channel is the use of a strip of plastic mesh material positioned along the bottom of the tank.

Various modifications of the above-described embodiments of the invention will be apparent to those skilled in the art, but it is to be understood that such modifications can be made without departing from the scope of the invention.

INDUSTRIAL APPLICABILITY

This invention will be found to be useful in the field of the manufacture of underground storage tanks for the storage of liquids.

We claim:
1. A double wall underground storage tank comprising:
   a) a cylindrical inner wall,
   b) a cylindrical outer wall comprising plastic resin and reinforcement fibers, and
   c) a layer of spacer filaments wound around the inner wall, the spacer filaments separating the inner and outer walls, and the spacer filaments being at least partially surrounded by voids to enable liquids to flow along the filaments.
2. The tank of claim 1 in which the spacer filaments are generally parallel to each other.
3. The tank of claim 2 in which the spacer filaments are spirally wound around the cylindrical inner wall.
4. The tank of claim 3 in which the spacer filaments are monofilaments.
5. The tank of claim 4 in which the spacer filaments are comprised of polypropylene.
6. The tank of claim 3 in which a separator layer is positioned on top of the spacer filaments.
7. The tank of claim 6 in which the inner wall is comprised of plastic resin and reinforcement fibers.
8. The tank of claim 3 in which the void spaces extend substantially without interruption from the top of the tank to the bottom of the tank.
9. The tank of claim 8 in which the rate of flow of water within the annular space from the top of the tank to the bottom of the tank is less than 2 minutes.
10. The tank of claim 3 in which a flow channel is positioned along the bottom of the tank to enable fluids to flow along the length of the tank.
11. The tank of claim 10 in which the flow channel comprises plastic mesh material positioned along the bottom of the tank.
12. The tank of claim 3 comprising a reservoir in communication with the annular space, the reservoir being adapted with means for sensing changes in the level of the leak detecting fluid in the reservoir.
13. The tank of claim 3 in which the void spaces have an average cross-sectional area of at least 0.125 cm$^2$.
14. A double wall underground storage tank comprising:
   a) a cylindrical inner wall,
   b) a layer of spacer filaments spirally wound around the inner wall, the spacer filaments separating the inner and outer walls, and the spacer filaments being at least partially surrounded by voids to enable liquids to flow along the filaments, the void spaces extending substantially without interruption from the top of the tank to the bottom of the tank, c) a separator layer positioned on top of the spacer filaments, and d) a cylindrical outer wall comprising plastic resin and reinforcement fibers.

15. The tank of claim 14 in which the spacer filaments are generally parallel to each other.

16. The tank of claim 15 in which the spacer filaments are monofilaments.

17. The tank of claim 16 in which the rate of flow of water within the annular space from the top of the tank to the bottom of the tank is less than 2 minutes.

18. The tank of claim 16 in which a flow channel is positioned along the bottom of the tank to enable fluids to flow along the length of the tank.

19. The tank of claim 14 in which the inner wall is comprised of plastic resin and reinforcement fibers.

20. The tank of claim 14 including a reservoir in communication with the annular space, the reservoir being adapted with means for sensing changes in the level of the leak detecting fluid in the reservoir.

* * * * *